2,816,096
REMOVAL OF OXYGEN FROM STREAMS CONTAINING HYDROCARBON DIOLEFINS AND THE LIKE

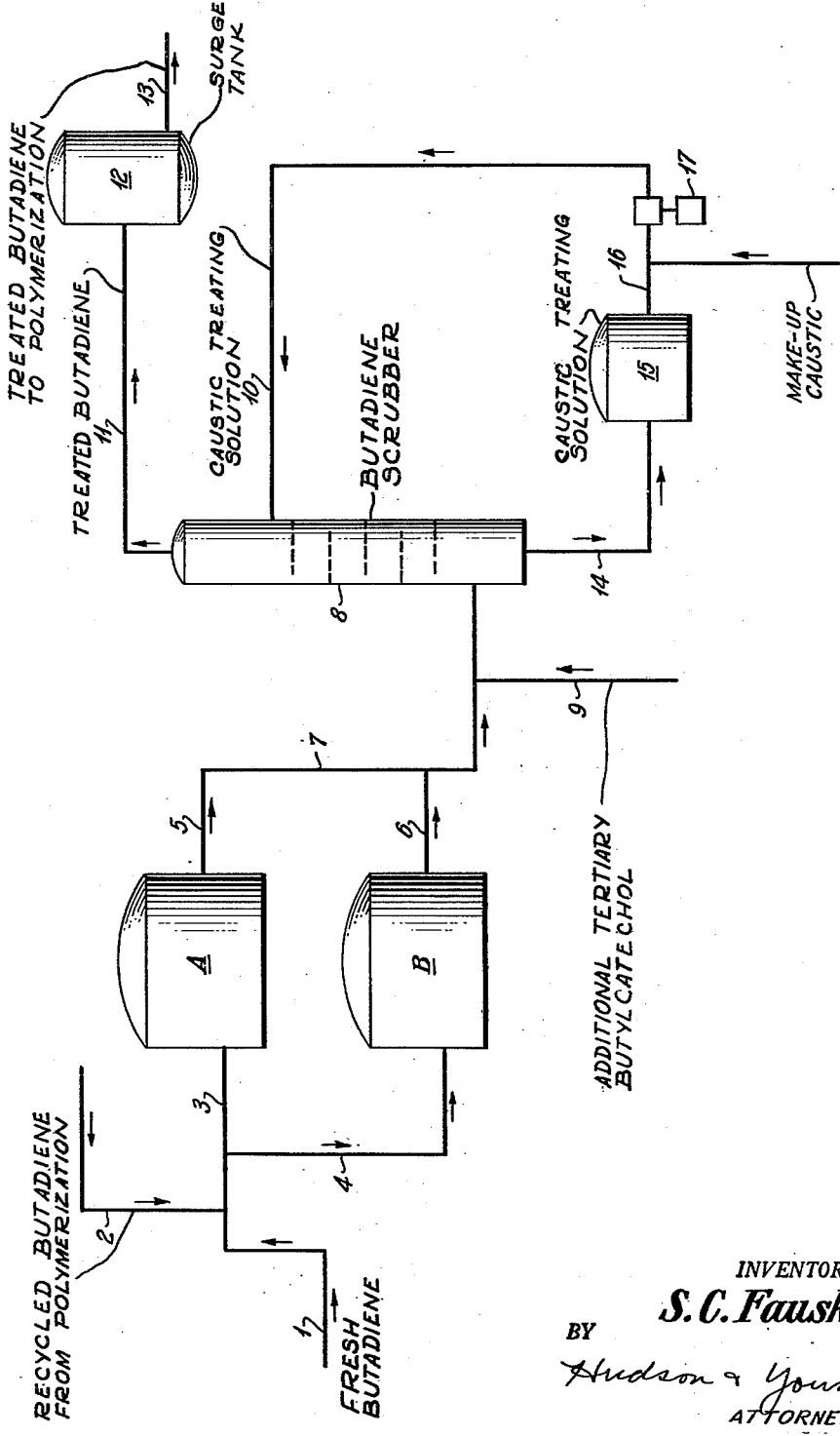

Sig C. Fauske, Borger, Tex., assignor to Phillips Petroleum Company, a corporation of Delaware Application January 16, 1953, Serial No. 331,543

10 Claims. (Cl. 260—82.1)

This invention relates to the removal of oxygen from streams containing olefins, diolefins and the like. In one aspect the invention relates to a process for the removal of oxygen from butadiene by subjecting the same to a solution of the sodium salt of tertiary butylcatechol in caustic soda. In another aspect this invention relates to the polymerization of butadiene, and like materials, to produce polymers having a correct Mooney viscosity, by pretreating the olefin feed to such a polymerization to remove oxygen therefrom. Other aspects of this invention are obvious from a consideration of this disclosure and the appended claims to the invention.

In polymerization reactions, for example, the copolymerization of butadiene and styrene for the production of the synthetic polymers, suitable in the preparation of synthetic rubbers, it has been observed from time to time that it is difficult to so operate the polymerization reactor that the polymerization is short-stopped at a proper time to produce a polymer of a correct or desired Mooney viscosity. Thus, the time required for polymerizing a batch of, say, butadiene and styrene varies appreciably. When shipping butadiene by tank car or otherwise it has been usual practice to add tertiary butylcatechol in a certain number of parts per million, depending upon the mode of transportation, usually about 100 parts per million in tank car shipments and about 25 parts per million in pipe line shipments, and to then remove the said tertiary butylcatechol by scrubbing the butadiene with caustic. Thus, the butadiene has been scrubbed with a caustic soda solution immediately prior to its use, for example, in the polymerization process. The caustic which has been used in the scrubbing operation has been used until it has become spent and then it has been discarded. A new batch of caustic has then been substituted fos the used and discarded caustic.

It has now been found that by increasing the proportion of tertiary butylcatechol in the butadiene before it is passed to the caustic scrubber so that it will contain approximately at least 75, preferably at least 90 or more parts per million of tertiary butylcatechol when it is passed into the caustic scrubber, the oxygen content of the butadiene will have been lowered considerably from that concentration which it would otherwise have possessed. It is now believed that the oxygen concentration in the scrubbed butadiene should be maintained between 0 and 5 parts per million, and it can be so maintained if the concentration of tertiary butylcatechol is maintained at at least 90 parts per million. This concentration will vary, of course, depending upon the proportion of oxygen present in the butadiene. Further, it has been found that changes in the concentration of oxygen in the butadiene entering into the reactor, in the polymerization of, say, butadiene with styrene changes the rate of polymerization. Thus, it has been found that the rate of polymerization, at least to a material extent, is dependent upon and can be controlled by the concentration of oxygen in the butadiene and styrene undergoing copolymerization. Indeed, it has been found that when the concentration of oxygen in scrubbed butadiene varies from 0 to 10 parts per million, erratic results are noted in respect of product formation. Th higher the concentration of oxygen in the butadiene, the slower the rates of polymerization in the polymerizing process. When the concentration of oxygen changes, it is difficult to know when to short-stop the copolymerization reaction to obtain the correct Mooney viscosity latex. When the oxygen concentration increases above 10 parts per million in the butadiene it is not advisable to change the recipe used in the polymerization process so polymerization will take more time and thereby slow up the rate of production because the delicate balance of oxidation and reduction which occurs in the copolymerization of butadiene and sytrene is upset.

Still further, it has been found that when increasing the concentration of tertiary butylcatechol in the butadiene which is to be caustic washed or scrubbed and then continuously adding some make-up caustic to the caustic scrubber and maintaining the concentration of the sodium salt of tertiary butylcatechol thus formed at a high concentration, and removing only a portion of caustic, preferably continuously, from the caustic solution being circulated, that a consistently considerably lowered oxygen concentration can be maintained in the butadiene entering into the polymerization reactor. By removing continuously a portion of the caustic and adding continuously a portion of fresh caustic, the caustic solution circulated will be maintained at a high and constant concentration of sodium salt of tertiary butylcatechol and sodium hydroxide and the oxygen concentration of the butadiene leaving the caustic scrubber will be maintained at a constant and, as already stated, low value. The importance of the continuous addition of very small proportions of fresh caustic and the continuous removal of "spent" caustic in like proportions is stressed here as leading to a very successful polymerization operation. It should be noted that when butadiene is transferred only short distances there may be present therein no tertiary butylcatechol. Also, ordinarily, freshly prepared butadiene, transported under pressure will not contain oxygen. However, as known, there is recycled from the polymerization operation a substantial quantity of unreacted butadiene and this unreacted diolefin is separated from the product employing a vacuum. The employment of a vacuum, due to leaks almost impossible to avoid in plant equipment, causes the recycled butadiene to contain some oxygen. The ratio of recycled butadiene to fresh butadiene can be of the order of 30:70. Tertiary butylcatechol, or its equivalent, is added to the recycled butadiene to inhibit the formation of peroxides. The concentration of the catechol will ordinarily be in the range of 90 to 100 parts per million.

Therefore, according to this invention, there has been provided a process for the removal of oxygen from an olefinic stream containing the same, for example, a stream containing butadiene, which comprises subjecting the said stream to the action of a relatively high concentration of the sodium salt of tertiary butylcatechol. In a preferred form of the invention, the concentration of the sodium salt of tertiary butylcatechol will be maintained in a caustic washing step of the process by continuously adding fresh make-up caustic while continuously removing spent caustic from the system. Also according to the invention, there has been provided a process for the polymerization at a constant reaction rate of an olefinic material such as butadiene, preferably with a material such as styrene, which comprises pretreating the olefinic material with a high concentration of sodium salt of tertiary butylcatechol in sodium hydroxide solution. In the specific embodiment of the invention which will be described below the solution of caustic is a solution of sodium hydroxide in water. The concentration of the sodium salt of the catechol which is maintained will be 7.5 percent to 25 percent by weight of the sodium hydroxide solution. The concentration of the sodium hydroxide in this solution should not be appreciably below 5% and not above about 25%. Fluidity for ready pumping of the caustic solution should be maintained. The "spent" treating solution will contain about 4 percent to 10 percent sodium hydroxide. In order to arrive at the concentration of sodium salt in the caustic soda solution, the butadiene stream fed to the caustic scrubber will contain a concentration of at least 25 parts per million of tertiary butylcatechol. Preferably the concentration will be at least 85 to 95 and even 100 parts per million of the butadiene. By continuously bleeding off only a small stream of the treating solution and adding a small stream of caustic to maintain the required concentration of caustic in the said solution, the concentration of the sodium salt of catechol in the said solution can be maintained at a constant high value. Thus, in the preferred form of the invention by maintaining the concentration of the catechol in the caustic solution at a constant high concentration, the effluent or treated butadiene coming from the caustic treater will contain a constant very low oxygen concentration, if any oxygen is contained at all in the said butadiene. It is preferred to maintain an excess of the catechol in the butadiene to provide for surges of the concentration of oxygen in the olefinic stream.

When operating the invention in the plant it was found that by dumping portions of the caustic solution, intermittently, that the oxygen content of the scrubbed butadiene could be reduced from 10 to 50 parts per million to 2 to 15 parts per million. However, if the continuous addition of caustic and continuous bleeding of spent caustic solution was used, the oxygen content of the scrubbed butadiene would be maintained at about 2 parts per million.

To confirm the ability of the caustic scrubber solution containing a high concentration of sodium salt of tertiary butylcatechol to remove oxygen from butadiene, varying amounts of the solution were agitated in bottles with butadiene containing a known amount of oxygen. The scrubber solution used contained 8.31 percent caustic and 0.308 percent tertiary butylcatechol. Subsequent analyses for oxygen in the treated butadiene gave the following results:

| Butadiene, grams | TBC Soln., ml. | Theoretical $O_2$ Milligrams | $O_2$ Found, Milligrams | $O_2$ Removed, percent |
|---|---|---|---|---|
| 100 | 0 | 15.07 | 14.0 | 0 |
| 100 | 0 | 15.07 | 14.2 | 0 |
| 100 | 10.0 | 15.07 | 11.8 | 16.3 |
| 100 | 20.0 | 15.07 | 9.36 | 33.6 |
| 100 | 30.0 | 15.07 | 7.43 | 47.3 |

From the table, it is evident that as the tertiary butylcatechol solution used was increased, the percent of oxygen removed was also increased considerably. Therefore, the residual oxygen was correspondingly decreased.

In a preferred method of operating this invention, the concentration of oxygen in the caustic scrubbed butadiene is maintained between 0 and 5 p. p. m. This low concentration of oxygen can be maintained by keeping the average concentration of tertiary butylcatechol in the butadiene about 10 times that of the oxygen in the butadiene and more preferably 10–15 times as much tertiary butylcatechol as oxygen in the butadiene. By continuously adding make-up caustic and continuously removing treating solution from the scrubbing process and when having a slight excess of tertiary butylcatechol in the butadiene over that lost in the removed caustic treating solution, an excess of sodium tertiary butylcatechol will be built up in the treating solution which will substantially completely remove any surges of high oxygen concentration contained in the butadiene being treated. However, the invention may be operated by maintaining the concentration of tertiary butylcatechol in butadiene being treated high enough that surges of high concentration of oxygen in the butadiene will be removed. In other words, the tertiary butylcatechol in the butadiene entering the treater plus the concentration of tertiary butylcatechol reacted with caustic in the treating solution, but unreacted with oxygen, should always be high enough to reduce the concentration of $O_2$ in the treated butadiene to below 5 p. p. m.

The concentration of oxygen in either the treated or untreated butadiene may be determined by any conventional method such as vaporizing a sample of the butadiene and determining the concentration of oxygen with an Orsat analyzer. After determining the concentration of oxygen in the butadiene, the concentration of tertiary butylcatechol in the butadiene can be regulated to maintain the concentration of oxygen in treated butadiene between 0–5 p. p. m.

It has been determined that one mol of tertiary butylcatechol when reacted with the caustic, as used herein, will react further with about one-half mol oxygen. Therefore, on a weight basis, according to the invention, there should be used about ten times as much tertiary butylcatechol by weight as there is oxygen to be removed from the olefinic stream.

Referring now to the drawing, there is shown schematically a portion of a plant in which polymerization of butadiene is effected. Fresh and recycled butadiene are fed by conduits 1 and 2 into conduit 3 and then into blending tank A. Likewise, fresh and recycled butadiene can be fed into blending tank B by means of conduits 1, 2 and 4. From tanks A and B, the blend, suitably prepared, is passed by means of lines 5 and/or 6 and line 7 into caustic scrubber 8. According to the invention, the sodium salt of tertiary butylcatechol concentration of the caustic solution circulated in caustic treater 8 can be built up and maintained by adding, if and when required, additional tertiary butylcatechol to the butadiene as it enters the treater, for example, through line 9. Or, if desired, the sodium salt concentration can be established and maintained by other means not shown in the drawing. In treater 8, the butadiene is scrubbed not only to remove tertiary butylcatechol therefrom, but also to remove oxygen therefrom and as already explained, this is accomplished by maintaining a high, preferably constant, concentration of sodium salt of tertiary butylcatechol in the caustic solution. To this end, caustic treating solution is introduced into treater 8 through line 10 and therein contacts the butadiene which, when treated, is removed from treater 8 through line 11 and passed by way of surge tank 12 and line 13 to a polymerizing reactor. The treated butadiene can be water-washed in means not illustrated to remove any entrained caustic therefrom. Caustic treating solution is removed from treater 8 by means of line 14 and passed to tank 15. In this tank, some of the spent treating solution is removed and an equivalent quantity of make-up caustic is added. The thus refortified caustic solution is removed from tank 15 by way of line 16 and pumped through pump 17 and line 10 back to treater 8. It will be obvious to one skilled in the art that the drawing is diagrammatic and that the continuous removal of caustic with continuous make-up being added to the caustic treating solution can be accomplished in any desired manner in the preferred embodiment of the invention in which such continuous withdrawal and continuous make-up addition are employed.

The following runs are based on data obtained in a commercial butadiene-styrene copolymer plant. The concentration of the caustic solution was 12½ percent and in each case it was used until it was reduced to about 7 percent. This caustic was circulated through a treating tower, which consisted of a 10-inch pipe over 12 feet long containing baffles extending about half-way across the pipe and about 8 to 10 inches apart, in a downwardly direction countercurrent to 1,870 gallons per hour of butadiene blend made up of butadiene recycled from said copolymer plant and new butadiene taken substantially directly from its source of production in a ratio of recycled to new butadiene of approximately 30:70.

| Run No. | TBC, p. p. m. Recycled Butadiene | TBC, p. p. m. New Butadiene | $O_2$ in the Blend, p. p. m. | Treated Butadiene $O_2$, p. p. m. | Days to reduce caustic to 7% NaOH |
|---|---|---|---|---|---|
| 1 | 90–100 | 100 | 13 | 3.3 | 10 |
| 2 | 90–100 | 0 | 34.4 | 30.5 | 60 |

It is evident from the foregoing runs that when the parts per million of tertiary butylcatechol in the blend was reduced in run 2 to substantially below the 90–100 parts per million of run 1, the concentration of residual oxygen in the treated butadiene was reduced by only about 4 parts per million and this was so in spite of the considerably larger number of parts per million of oxygen originally present in run 2. Further, as evidence of the importance of maintaining the high concentration of tertiary butylcatechol in the treated blend and according to the invention, it is noted that in run 2 it required 60 days to reduce a concentration of caustic to 7 percent which is six times the number of days it required in run 1.

Therefore, it is believed clear from a consideration of these data that to obtain a large reduction of residual oxygen, it is necessary to maintain an initially high concentration of tertiary butylcatechol in the olefinic stream fed to treater 8 or its equivalent.

It will be obvious to those skilled in the art that while the removal of tertiary butylcatechol has been largely described herein as being from butadiene, it is clear that catechol can be removed, together with other stabilizers, from other olefinic materials, for example, styrene.

Reasonable variation and modification are possible within the scope of the foregoing disclosure, drawing, and appended claims to the invention, the essence of which is that it has been found that by increasing the concentration of the sodium salt of tertiary butylcatechol in the caustic soda solution employed to remove tertiary butylcatechol from an olefinic stream containing, for example, butadiene prior to the polymerization thereof, that the oxygen concentration in the treated butadiene has been considerably reduced and that the said reduced oxygen concentration can be maintained at a constant controllable value by maintaining constant the said high concentration of tertiary butylcatechol sodium salt in the said sodium hydroxide treating solution, and that therefore, a process for the control of the rate of polymerization of butadiene with, for example, styrene, has been made possible.

I claim:

1. The removal of oxygen from an olefinic hydrocarbon stream containing the same which comprises treating said stream with a sodium hydroxide solution consisting essentially of 5% to 25% by weight sodium hydroxide and 7.5% to 25% by weight of the sodium salt of tertiary butylcatechol.

2. A method according to claim 1 wherein the olefinic hydrocarbon material is butadiene.

3. A method according to claim 1 wherein the olefinic hydrocarbon material is a diolefin.

4. In the polymerization of olefinic hydrocarbon material to produce a polymeric material wherein said olefinic hydrocarbon material is polymerized under conditions to polymerize said olefinic hydrocarbon material, the improvement which comprises treating the said olefinic hydrocarbon material to remove oxygen therefrom by passing said material into contact with an alkaline solution consisting essentially of a concentration of an alkali metal salt of tertiary butylcatechol in the range of 7.5 to 25% by weight, the concentration of alkali in said solution being in the range 5% to 25% by weight.

5. In the controlled copolymerization of butadiene with styrene wherein said butadiene is copolymerized with said styrene under conditions of copolymerization to produce a polymeric material, the step of pretreating the butadiene fed to the said polymerization with a solution of caustic soda consisting essentially of 7.5 to 25% by weight of the sodium salt of tertiary butylcatechol, the said caustic soda solution containing 5% to 25% by weight of sodium hydroxide.

6. In the controlled polymerization of butadiene wherein said butadiene is polymerized under conditions to polymerize said butadiene, the steps which comprise pretreating the said butadiene with a solution, consisting essentially of 7.5% to 25% by weight of the sodium salt of tertiary butylcatechol, the said solution containing 5% to 25% by weight of sodium hydroxide, by-passing said butadiene into contact with said treating solution and continuously maintaining the concentration of the said sodium salt of tertiary butylcatechol and said sodium hydroxide at a concentration of the sodium salt of tertiary butylcatechol in the range of 7.5 to 25% by weight and at a concentration of sodium hydroxide in the range of 5% to 25% by weight, respectively.

7. A method according to claim 6 wherein the concentration of the sodium salt of tertiary butylcatechol is maintained by adjusting the concentration of tertiary butylcatechol in the butadiene passed into contact with the said treating solution and wherein the concentration of sodium hydroxide in the treating solution is maintained by continuously replacing a small proportion of the sodium hydroxide in said treating solution.

8. A method according to claim 6 wherein the concentration of the tertiary butylcatechol in the butadiene being treated is maintained at a concentration which is 10 to 15 times that of oxygen in the butadiene.

9. A method according to claim 8 wherein make-up treating solution is continuously added to the treating system and treating solution is continuously removed.

10. In the controlled polymerization of butadiene wherein said butadiene is polymerized under conditions to polymerize said butadiene, the steps which comprise pretreating the said butadiene with an aqueous treating solution, consisting essentially of 5 to 25 percent by weight of sodium hydroxide, by passing said butadiene, containing from 10 to 15 times as much tertiary butylcatechol as oxygen by weight, into contact with said treating solution.

References Cited in the file of this patent

UNITED STATES PATENTS 2,402,113    Hatch et al.    June 11, 1946
2,631,175    Crouch    Mar. 10, 1953